Patented Oct. 7, 1941

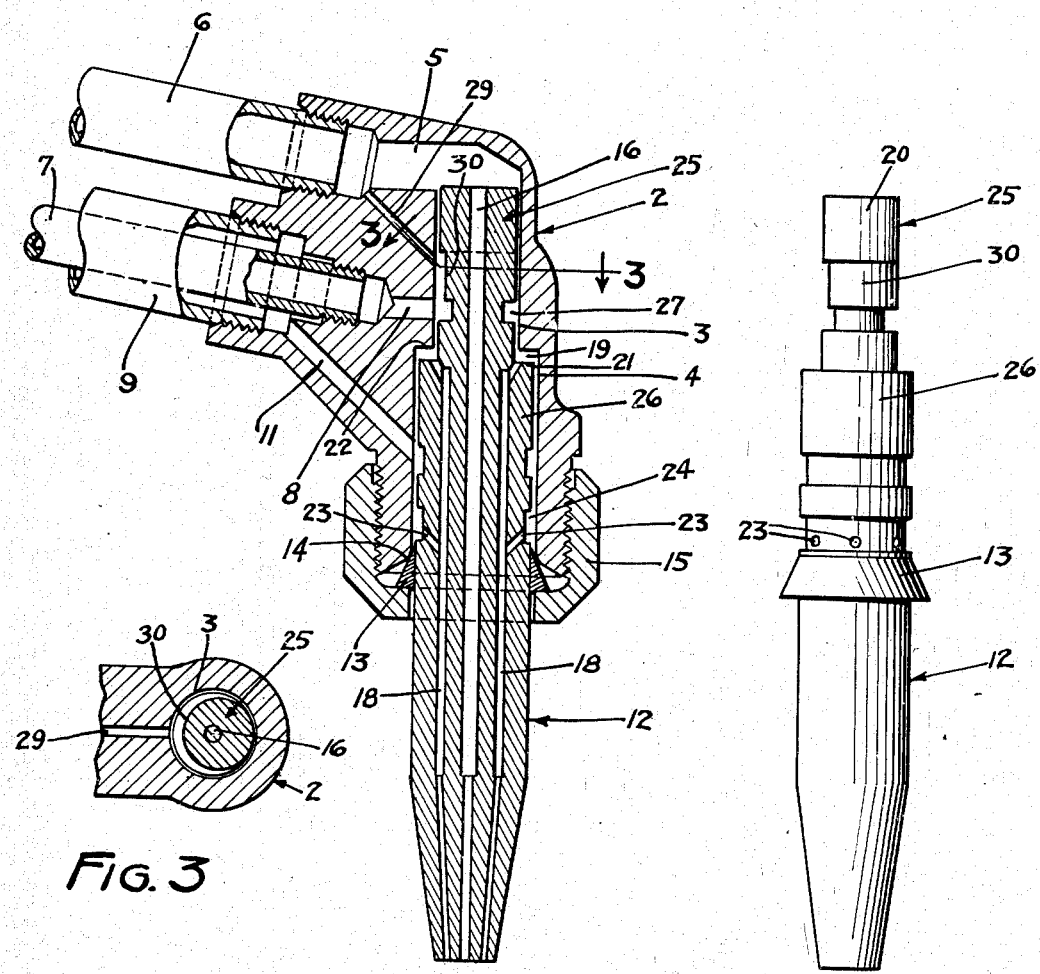

2,258,340

UNITED STATES PATENT OFFICE 2,258,340

CUTTING TORCH

Elmer H. Smith, Minneapolis, Minn., assignor to Smith Welding Equipment Corporation, Minneapolis, Minn., a corporation of Minnesota Application August 11, 1939, Serial No. 289,616

7 Claims. (Cl. 158—27.4)

The present invention relates to new and useful improvements in cutting torches, generally.

Conventional cutting torches, as now commonly constructed, usually comprise a tip provided with a central duct usually referred to as the "cutting duct" surrounded by a plurality of preheating ducts. The supply of oxygen for the cutting and the preheating ducts is received from a common source, and independently operated valves are therefore necessary in order to control the flow of oxygen to the cutting and preheating ducts. Since the oxygen is usually supplied to the cutting duct at a relatively higher pressure than the oxygen supplied to the preheating ducts, means is usually provided in conventional torch heads for preventing oxygen leakage from the high pressure supply to the preheating ducts. In conventional cutting torches, the means provided for preventing such leakage is usually accomplished by a metal-to-metal seat.

When a conventional torch is in operation, and the supply of oxygen to the cutting duct is subsequently turned on, it usually becomes necessary to slightly increase the flow of oxygen to the preheating ducts, because the increased flow of oxygen to the cutting orifice tends to reduce the supply of oxygen to the preheating flames, whereby the manually operated oxygen control valves must be readjusted until the preheating flames have been restored to their normal or neutral condition. This requires more or less constant manipulation of the oxygen control valves of the torch, which is undesirable. It is therefore highly desirable that means be provided in the construction of a torch head, whereby the operation of periodically turning the cutting jet on or off, will have no effect upon the operation of the preheating flames.

An object of the present invention, therefore, is to provide a cutting torch which is so constructed that once the preheating flames have been adjusted to their proper preheating condition, or highest intensity, the supply of oxygen thereto will remain substantially unchanged in characteristics, regardless of whether or not the torch is being used for cutting, whereby the operation of valves for maintaining the preheating flames neutral, during the operation of the torch, may be completely eliminated, thereby greatly facilitating the operation of the torch.

A further and more specific object is to so construct the torch head and tip that an intentional and controlled leakage is provided between the oxygen supply passage for the cutting duct and the fuel gas supply chamber for the preheating flames, whereby when oxygen under high pressure is supplied to the cutting duct, a portion of the oxygen delivered to the cutting duct will enter the fuel gas supply chamber for the preheating ducts, caused by the differential in pressure between the two gases, whereby the preheating flames will continue to function in their normal condition, regardless of whether or not oxygen is being supplied to the cutting duct for cutting purposes.

A further object of the invention resides in providing the tip with a relatively long cylindrical end portion, the diameter of which is relatively less than the bore in which said end portion is received, whereby a relatively long, narrow, annular passage is provided when the torch tip is positioned in the torch head, which annular passage establishes communication between the passage for supplying high pressure oxygen to the cutting duct and the chamber for supplying a low pressure fuel gas to the preheating ducts.

A further object resides in the novel construction of the torch head and tip, whereby the use of a metal-to-metal seat to prevent leakage between the high pressure oxygen passage in the torch head and the preheating ducts may be entirely dispensed with, thereby simplifying the construction and manufacture of the torch head and tip. The construction of the parts is such that intentional leakage of the gas from the high pressure oxygen supply passage to the fuel gas chamber for the preheating flames is provided, whereby the characteristics of the preheating flames will remain substantially unchanged during the operation of the torch, regardless of whether used for preheating only or preheating and cutting.

Other objects of the invention reside in the novel construction of the torch tip and head, whereby the leakage or flow of oxygen from the high pressure passage in the head to the fuel gas chamber, may be controlled; in the provision of a torch head having but a single metal-to-metal seat, which serves to prevent leakage of the gases from the head to the atmosphere; in the construction of the tip and head, whereby the tip may readily and quickly be inserted in the head or removed therefrom, by the manipulation of a single clamping nut; and whereby the tip may also be rotatively adjusted in the head to control the leakage or flow of oxygen from the high pressure oxygen passage to the fuel gas chamber; and, in the provision of a cutting torch having a minimum of control valves.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a sectional view through the assembled torch head and tip, showing means whereby the flow of oxygen from the high pressure oxygen supply conduit to the fuel gas chamber may be controlled;

Figure 2 is an elevational view of the torch tip removed from the head;

Figure 3 is a detail sectional view substantially on the line 3—3 of Figure 1;

Figure 4 is a detail sectional view showing the upper end portion of the tip loosely fitted within a bore in the torch head; and Figure 5 is a view similar to Figure 4, but showing the upper end portion of the tip provided with a longitudinally extending peripheral groove through which a portion of the high pressure oxygen delivered to the cutting duct may flow to the fuel gas chamber.

In the selected embodiment of the invention, herein disclosed, there is illustrated in Figure 1, for purposes of disclosure, a torch head, generally designated by the numeral 2, having coaxially disposed bores 3 and 4, which will hereinafter be referred to as inner and outer bores. The outer bore 4 is shown relatively larger in diameter than the inner bore 3, but it is to be understood that in some instances, it may be found desirable to combine the two bores in a single bore, in which case the length of the single bore may be substantially equal to the combined lengths of the bores 3 and 4, herein shown. The inner end of the inner bore communicates with a passage 5, which is in communication with one end of a conduit 6, the opposite end of which is adapted to be connected to a supply of oxygen under pressure in the usual manner.

The inner bore 3 is also in communication with an oxygen supply conduit 7 through a passage 8 provided in the torch head. An acetylene or fuel gas supply conduit 9 has one end received in a threaded socket provided in the head 2, and has its opposite end connected to a suitable supply of acetylene, not shown. The acetylene supply conduit 9 is shown telescoped over the relatively smaller oxygen supply conduit 7, and communicates with the larger or outer bore 4 through a passage 11.

The opposite ends of the conduits 6, 7, and 9 are connected to the usual handle of the cutting torch (not shown) which is provided with suitable valves for controlling the flow of oxygen and acetylene to the torch head through said conduits. The valve handle and the valves for controlling the supply of oxygen and acetylene are well known in the art, and it is therefore thought unnecessary to herein show the same in detail.

A torch tip, generally designated by the numeral 12, is removably supported in the head 2. To prevent leakage of the gases to the atmosphere, a tapered gland 13 is provided on the body of the torch tip 12, which is adapted to engage a seat 14 provided in the torch head 2. The lower end of the head is threaded to receive a clamping nut 15 which serves to secure the torch tip in position in the head, as will readily be understood by reference to Figure 1.

The torch tip has a central cutting duct 16 which extends the length thereof. A plurality of preheating ducts 18 are also provided in the tip 12 and have their upper ends communicating with an annular chamber 19 provided between a shoulder 21 on the body of the torch tip and a shoulder 22 disposed between the bores 3 and 4. The preheating ducts 18 have branch ducts 23 connecting them with an annular fuel chamber 24 which is in direct communication with the passage 11 of the acetylene supply conduit 9. The chamber 24 may be formed by providing one or more circumferential grooves in the body of the tip. The torch tip, as above described, is well known in the art.

One of the important features of the present invention resides in the construction of the torch head 2 and the tip 12, whereby but a single metal-to-metal or direct contact sealing means is necessary to prevent leakage of the gases from the torch head. By referring to Figures 1 and 2, it will be noted that the torch tip is shown provided at its upper end with a reduced end portion, generally indicated by the numeral 25, which comprises a concentric terminal portion 20 and an eccentric portion 30. The terminal portion 20 has a free sliding fit in the bore 3, whereby the wall of the portion 25 may not directly contact the wall of the bore 3. The same is true of the fit of the cylindrical portion 26 of the tip in the relatively larger bore 4. By so constructing the tip, manufacture is greatly facilitated in that the torch tip may readily be inserted into or removed from the bores 3 and 4, when the clamping nut 15 is detached. In other words, when the clamping nut 15 is detached from the head, the torch tip is loosely supported in the head and may readily be removed from the bores 3 and 4, or relatively rotated therein. To insert the tip into the head, the operator need not exercise any particular care, because the reduced extension 25 and relatively larger cylindrical portion 26 of the tip do not engage the walls of the bores 3 and 4, respectively, with a metal-to-metal contact, but have a free sliding fit therein. When the nut 15 is secured in position on the head, as shown in Figure 1, the gland 13 is forced into leak-tight engagement with the seat 14, whereby leakage of gas from the head to the atmosphere at this point is positively eliminated.

In torch heads of the character herein disclosed, it is usually common practice to provide a metal-to-metal sealing means between the inner end of the torch tip and the wall of the bore 3, which sealing means may be located at a point between the oxygen supply passages 5 and 8. The provision of such a seat is to positively prevent leakage of the high pressure oxygen from the passage 5 to the low pressure passage 8, which supplies oxygen to the preheating fuel gas.

In cutting torches, as now commonly constructed, and wherein a seat is provided between the passages 5 and 8, it is usually customary in the operation of the torch to readjust the valve (not shown) which controls the supply of oxygen to the preheating flame, each time high pressure oxygen is supplied to the cutting duct 16 for cutting purposes. The reason for such readjustment of the above mentioned valve, is that when the valve (not shown) which controls the supply of oxygen to the cutting duct 16 is opened, the high pressure oxygen flowing to the duct 16 has a tendency to "rob" or reduce the flow of oxygen through the conduit 7 to the preheating flame, with the result that the preheating flame is changed in character. This deficiency in the supply of oxygen to the preheating flame may be manually compensated for by manipulation of the oxygen control valve in the conduit 7. Conversely, when the flow of oxygen to the cutting duct 16 is interrupted, the preheating flame must again be readjusted in order to restore it to its neutral or normal condition. To maintain the preheating flame at maximum efficiency, may therefore require more or less constant manipulation of the oxygen control valve in the conduit 7, during the operation of the torch.

Applicant has discovered that by providing an "intentional" predetermined leakage of oxygen between the oxygen supply passage 5 and an annular chamber 27, formed by providing an annular groove in the extension 25 of the torch tip, and which chamber is in direct communication with the oxygen supply conduit 7, that each time the oxygen control valve for the conduit 6 is opened to supply oxygen to the cutting duct 16, a portion of the oxygen delivered into the passage 5 will leak therefrom into the gas chamber 27, whereby the deficiency in the supply of oxygen to the preheating flame is restored to normal, so that the preheating flame will continue to function in its normal, neutral or unchanged condition. Such leakage of the oxygen from the passage 5 to the chamber 27 may be obtained in various ways. In Figure 4, for example, it is brought about by making the extension 25 of the torch tip slightly smaller in diameter than the bore 3, whereby an annular restricted passage is provided between the walls of the extension 25 and bore 3. This annular passage is so small and restricted that there is little danger of the low pressure fuel gas to leak therethrough into the passage 5, during the initial operation of the cutting torch, as when initially preheating the work.

The loose fit provided between the extension 25 and the bore 3 serves a dual function in that it permits an intentional leakage of gas from the passage 5 to the annular chamber 27, thereby to compensate for the deficiency in the normal supply of gas to the chamber 27, when gas is supplied to the cutting duct 16, and, at the same time, greatly facilitates manufacture and assembly by the elimination of a metal-to-metal seat between the extension 25 of the torch tip and the wall of the bore 3 of the valve body.

In the form shown in Figures 1, 2, and 3, the extension 25 of the torch tip is provided with a terminal portion 20, as hereinbefore stated. The terminal portion 20 is machined to have a free sliding fit in the bore 3, which fit may be such as to substantially prevent gas leakage between said parts. In other words, the terminal 20 is so fitted in the bore 3, that the tip may readily be inserted into the torch head or removed therefrom without any particular care upon the part of the operator. In the structure as shown in Figures 1 to 3, the added supply of oxygen to the chamber 27, to compensate for the deficiency in the normal supply of oxygen thereto, when oxygen is being supplied to the cutting duct 16, is not dependent upon a clearance provided between the upper terminal 20 of the torch tip and the wall of the bore 3. In the form, as disclosed in Figures 1 to 3, a duct or by-pass 29 is provided in the upper part of the head 2, and has one end communicating with the bore 3 at a point below the terminal portion 20 of the tip. The opposite end of the duct 29 communicates with the passage 5, as best shown in Figure 1.

As previously stated, the eccentric portion 30 of the extension 25 of the torch tip is located between the terminal portion 20 and the chamber 27. The eccentric portion 30 serves to control the flow of oxygen through the duct 29 to the chamber 27, when oxygen is being supplied to the cutting duct 16. When the torch tip is positioned, as shown in Figure 1, it will be noted that the low side of the eccentric portion 30 is disposed adjacent to the duct 29, whereby maximum flow is obtained through the duct 29. When the eccentric 30 is rotated 180° from the position shown in Figure 1, so that its high point is positioned adjacent to the duct 29, flow through said duct is obstructed. It will therefore be seen that in the structure disclosed in Figures 1, 2, and 3, the flow of oxygen through the passage 29 to the chamber 27 may be accurately controlled by rotative adjustment of the torch tip 12.

In the form shown in Figure 5, the upper reduced end portion 25 of the tip is adapted to be received in the bore 3 with a sliding fit, in substantially the same manner as the terminal portion 20, shown in Figures 1 and 2. To permit a portion of the oxygen delivered to the cutting duct 16 to be diverted into the chamber 27, a longitudinally extending groove 32 is shown provided in the periphery of the extension 25 of the torch tip. This groove, it will be noted, establishes communication between the high pressure oxygen passage 5 and the low pressure oxygen passage 8, or chamber 27, whereby when oxygen is supplied to the cutting duct 16, a portion of it will flow to the chamber 27, thereby to compensate for the deficiency in the supply of oxygen to the preheating ducts 18 from the conduit 7.

The novel torch head and tip herein disclosed, has proven very practical and efficient in operation. By permitting a portion of the gas delivered to the cutting duct 16 to flow to the chamber 27, each time the cutting torch is used for cutting, the operator need not re-adjust the preheating flames by manipulation of the valve which controls the flow of oxygen through the conduit 7. The "leakage" or controlled flow of oxygen from the high pressure oxygen passage 5 to the chamber 27 is such as to readily compensate for any deficiency in the supply of oxygen to the preheating ducts 18 from the conduit 7, during the cutting operation. The added supply of oxygen to the fuel gas during the cutting operation, therefore, is accomplished automatically, whereby the operation of the torch is greatly simplified, with the result that the work may be expedited.

Also, the elimination of a metal-to-metal seat to prevent leakage of the gas between the passages 5 and 8, greatly simplifies construction in that the fit of the extension 25 of the tip in the bore 3 is such that the tip may readily be inserted into or removed from the torch head. As hereinbefore stated, because of the low pressure of the fuel gas, said gas does not leak into the upper passage 5 of the torch head because of the restricted passage provided between the chamber 27 and the passage 5. The oxygen delivered to the cutting duct 16 is of relatively higher pressure than the pressure of the gas in chamber 27, which results in a portion thereof flowing or leaking into the chamber 27, because of the passage provided between the oxygen passage 5 and the chamber 27, which permits such leakage of the oxygen.

When the construction shown in Figures 1, 2, and 3, is used, the flow of gas or oxygen from the passage 5 to the fuel chamber 27 may be readily controlled by simply loosening the clamping nut 15 and relatively rotating the tip in the head until the proper supply of oxygen is delivered to the chamber 27 to compensate for the deficiency in the supply of oxygen thereto from the conduit 7. In Figures 1, 2, and 3, therefore, the relative position of the tip in the head is important in that the position of the eccentric portion 30 with respect to the duct 29 controls the flow of added oxygen to the chamber 27, each time the torch is used for cutting.

In the structure shown in Figures 4 and 5, the position of the tip within the head is unimportant. In the structure shown in Figure 4, the size of the annular restricted passage provided between the walls of the extension 25 and the bore 3 remains constant, regardless of the position of the tip in the torch head. In Figure 5, the same holds true in that the flow of gas through the groove 32 will be the same, regardless of the position of the tip in the head 2.

I claim as my invention:

1. A torch head having a bore therein provided with means at its inner end for supplying high pressure oxygen thereto, a passage for delivering acetylene to said bore at a point spaced from the inner end thereof, means for supplying preheating oxygen to said bore, a torch tip having its inner end portion received in said bore between the high pressure oxygen supply means and said acetylene passage and provided with a central cutting oxygen duct which is in direct communication with said high pressure oxygen supply means, a combustible mixture chamber in communication with said acetylene supply passage, means for supplying preheating oxygen to said chamber, said tip having a preheating mixture duct therein which is in communication with said combustible mixture chamber, and the walls of said bore and inner end portion of the torch tip being spaced apart and cooperating to provide a restricted passage through which a portion of the high pressure oxygen delivered to the inner end of the bore may pass to the combustible mixture chamber, when oxygen is supplied to the cutting oxygen duct, thereby to compensate for deficiency of oxygen in the preheating flame.

2. A torch head comprising a bore, a tip having one end received in said bore, said tip being provided with a cutting oxygen duct and a preheating mixture duct and having a portion of its periphery spaced from and cooperating with a portion of the wall of said bore to provide a combustible mixture chamber which is in communication with the preheating mixture duct, said head having a passage therein communicating with the cutting oxygen duct, means for supplying high pressure cutting oxygen to said passage, means for delivering acetylene to said chamber, means for supplying preheating oxygen to the chamber, said acetylene and preheating oxygen intermixing to provide a combustible mixture, and means embodied in the construction of the torch head and said tip for constantly by-passing a portion of the high pressure oxygen to the combustible mixture chamber, each time high pressure oxygen is delivered to the cutting oxygen duct for cutting purposes, thereby to compensate for deficiency of oxygen in the combustible mixture supplied to the preheating mixture duct.

3. A torch head having a bore therein, a tip mounted in said bore and provided with a cutting oxygen duct and preheating mixture ducts, a portion of the wall of said bore and a portion of the tip body cooperating to provide a combustible mixture chamber which is in communication with the preheating mixture ducts, said head having a passage therein for supplying high pressure oxygen to the cutting oxygen duct, means for delivering measured quantities of acetylene and preheating oxygen to said chamber to provide a combustible mixture, and a restricted passage formed by the inner end of said bore and the inner end of the tip through which a portion of the high pressure oxygen may by-pass to the combustible mixture chamber, when the torch is used for cutting purposes, thereby to maintain substantially constant the supply of oxygen to the combustible mixture chamber and the preheating mixture ducts during cutting operation of the torch.

4. A torch head comprising a body having a bore therein, a tip mounted in said bore, said tip being provided with a cutting oxygen duct and having an annular recess in its periphery cooperating with a portion of the wall of the bore to provide an annular combustible mixture chamber, said tip having a plurality of preheating mixture ducts communicating with said chamber, said head having a passage communicating with the bottom of said bore for supplying high pressure oxygen to the cutting oxygen duct, means for delivering preheating oxygen to said chamber, means for delivering acetylene to said chamber to intermix with the preheating oxygen delivered thereto and provide a combustible mixture, a by-pass at the inner end of the head through which a portion of the high pressure oxygen flowing to the cutting oxygen duct is by-passed to said chamber to compensate for the reduction in the normal flow of preheating oxygen thereto, when the cutting flame is operated, and valveless means for accurately controlling the flow of high pressure oxygen through said by-pass, during the cutting operation of the torch, whereby the preheating flame projected from the preheating mixture ducts of the tip may continue to operate normally during the cutting operation.

5. A torch head having inner and outer axially alined bores, the inner bore being relatively smaller in diameter than the outer bore, means for supplying high pressure oxygen to the inner end of the smaller bore, a torch tip having cylindrical portions received respectively in said bores, said tip having a central cutting oxygen duct extending lengthwise therethrough and communicating at its inner end with the high pressure oxygen supply means, said tip also having a plurality of preheating mixture ducts therein, means for supplying measured quantities of acetylene and preheating oxygen to said preheating mixture ducts to provide a combustible mixture, and the diameter of the cylindrical portion of the tip which is received in said smaller bore being slightly less than said bore, thereby to provide an annular restricted passage through which a portion of the high pressure oxygen may by-pass to the preheating mixture ducts to compensate for deficiency of oxygen in the combustible mixture, when high pressure oxygen is delivered to the cutting oxygen duct.

6. A torch head having inner and outer axially alined bores, the inner bore being relatively smaller in diameter than the outer bore, means for supplying high pressure oxygen to the inner end of the smaller bore, a torch tip having alined cylindrical portions received respectively in said bores, said tip having a central oxygen cutting duct extending lengthwise therethrough and communicating at its inner end with the high pressure oxygen supply means, said torch tip also having a plurality of preheating mixture ducts therein, means for supplying measured quantities of acetylene and preheating oxygen to said preheating mixture ducts to provide a combustible mixture, and a groove in the periphery of the smaller end portion of the tip through which a portion of the high pressure oxygen may by-pass to the preheating mixture ducts to compensate for oxygen deficiency in the preheating flame projected from the preheating mixture ducts of the tip, when oxygen is delivered to the cutting oxygen duct for cutting purposes.

7. A torch head having a bore therein, a tip having one end received in said bore and provided with a cutting oxygen duct, a plurality of preheating mixture ducts in said tip, means for supplying high pressure oxygen to the cutting oxygen duct, when the torch is utilized for cutting, means for delivering measured quantities of preheating oxygen and acetylene to the preheating mixture ducts to provide a combustible mixture for a preheating flame, and a restricted passage in the inner end of the torch head connecting the high pressure oxygen supply means to the preheating oxygen supply means, whereby a portion of the high pressure oxygen flowing to the cutting oxygen duct may by-pass to the mixture of acetylene and oxygen to compensate for oxygen deficiency in the preheating flame during the cutting operation.

ELMER H. SMITH.